United States Patent
Sun

(10) Patent No.: US 6,233,378 B1
(45) Date of Patent: May 15, 2001

(54) OPTICAL SWITCH UTILIZING TWO UNIDIRECTIONAL WAVEGUIDE COUPLERS

(75) Inventor: De-Gui Sun, Ottawa (CA)

(73) Assignee: Nu-Wave Photonics Inc., Ottawa (CA)

( * ) Notice: Subject to any disclaimer, the term of this patent is extended or adjusted under 35 U.S.C. 154(b) by 0 days.

(21) Appl. No.: 09/570,712

(22) Filed: May 15, 2000

(51) Int. Cl.[7] ................................................. G02B 6/26
(52) U.S. Cl. ................................................. 385/22
(58) Field of Search ........................... 385/15–23, 147, 385/10, 37, 14, 17, 4, 8; 359/572, 900

(56) References Cited

U.S. PATENT DOCUMENTS

| | | | |
|---|---|---|---|
| 4,106,848 | * | 8/1978 | Conwell et al. ........................ 385/4 |
| 4,531,809 | * | 7/1985 | Carter et al. ........................ 359/572 |
| 4,983,006 | * | 1/1991 | Nishimoto ........................ 385/16 |
| 5,828,796 | * | 10/1998 | Han et al. ........................ 385/16 |
| 5,887,089 | * | 3/1999 | Deaconj et al. ........................ 385/10 |

* cited by examiner

Primary Examiner—Akm E. Ullah
(74) Attorney, Agent, or Firm—Friedrich Kueffner

(57) ABSTRACT

An optical waveguide switch using two unidirectional waveguide couplers with coupling gratings is provided. Each unidirectional waveguide coupler compromises two waveguide channels and a coupling grating along one waveguide channel. Two such waveguide couplers with coupling gratings are positioned on a substrate to form a symmetric couple-pair. An optical signal launched into the input port of the first coupler may exit from the output port of the second coupler. A modulating electrode is used to eliminate the coupling gratings on the two couplers, and the optical signal launched into the input port of the first coupler exits from its own output port. Similarly, this process can also be performed for an optical signal launched into the second coupler. Thus an effective 2×2 switching performance is implemented with this structure. M×N switching performance may also be implemented with several 2×2 waveguide switches.

1 Claim, 2 Drawing Sheets

OPTICAL SWITCH UTILIZING TWO UNIDIRECTIONAL WAVEGUIDE COUPLERS

FIELD OF THE INVENTION

The present invention relates to optical waveguide switches in general, and in particular a symmetrical two-by-two switch utilizing two waveguide couplers each having a coupling grating. More particular, still, it relates to an insulating thermo-optical switch suitable for optical communication/switching systems, interconnects and fiber based networks.

BACKGROUND OF THE INVENTION

Rapid developments and applications of communication systems are stimulating new microstructure optoelectronic technologies. Among the various microstructure optoelectronic technologies, integrated optics represents a promising approach. Future electronic systems will require on-chip signal conversion between electrical, optical and microwave media to reach speed and functionality projections. A radically different alternative concept exploits the use of photons, instead of electrons, to carry information in what is commonly referred to as "optical interconnects." One implementation of this strategy relies on the integration of semiconductor- or polymer-based optoelectronic interconnects on a host silicon (Si) substrate, and thus requires feasible semiconductor- or polymer-based optoelectronic technologies in order to produce Si-based photonic devices for optical waveguide interconnects.

Although the technologies for some electro-optic (EO) waveguide devices based on inorganic materials such as crystals and semiconductors have had a long development history, the conditions for manufacturing and processing integrated optical devices are still seriously limited. Thermo-optic (TO) waveguide devices based on polymers and other temperature sensitive materials have shown an exciting potential in low-speed operations because of their flexibility in fabrication and processing. The TO waveguide devices can be built with glass, silica crystal and polymer because only upper modulating electrodes are needed. Especially, polymers not only have higher thermal effects but can also be directly used to fabricate multi-layer integrated optical circuits (IOC) on top of electronic substrate such as Si and Silica. Polymer-based TO waveguide devices have been successfully applied in fiber-optic communications systems and have been receiving more and more attention in this field. A variety of polymer-based new TO waveguide devices aimed at providing feasible structures with enhanced functionability have been reported. Among the active devices in optical communication systems, optical space switches are key components. Large-scale matrix switches are required to meet the increasing switching capacity. Increasing capacity is required as the number of ports increases. A basic switching unit, such as 2×2 or 1×2 switch, is a suitable unit for building various high capacity switching device.

Wavelength-division-multiplexing (WDM) lightwave systems provide optical communication in wavelength multiplex mode. Recently, research on the devices and techniques for high capability WDM systems or dense wavelength division multiplexing (DWDM) systems having effective network restoration capability, i.e., reconfigurable WDM systems, has received attention. Therefore, single and arrayed high performance optical waveguide switching devices will have wide applications in fiber-optic communication.

Currently, the adding or dropping of signals is accomplished with bulk optics. Individual components such as optical multiplexers, optical demultiplexers, 2×2 optical switches, and variable optical attenuators are used to build a programmable optical add/drop network elements. Unfortunately, this solution is costly and labor intensive. By driving integration down to the component level, it is possible to get away from bulk optics with a silicon optical bench. A Si-based array waveguide is used with optical multiplexers and demultiplexers. In this case, optical switching is done with thermo-optic switches. Interconnectivity between rings for provisioning and restoration is also necessary. Today, this function is performed at the electrical level with digital crossconnects at lower bit rates. In the future, it may take place at higher bit rates in the optical layer. In theory, this is possible with optical switching. With such systems, the challenge becomes the provision of reconfiguring an input port to any output port. The bulk optics used today in programmed optical add/drop network elements can serve as prototype systems for reconfigurable optical switches. Since these elements are large and costly to construct, miniaturization is an advantage. Si-based optical-bench technology combined with thermal-optical switches points to the possibility of smaller-scale switches.

SUMMARY OF INVENTION

The present invention provides a thermo-optical, waveguide-based, switching unit utilizing a pair of waveguide couplers with coupling gratings, which provides unidirectional and bidirectional coupling between single mode waveguides. The switch provides high isolation in a simple, symmetrical, waveguide coupler structure.

A waveguide device based on the present invention comprises two unidirectional waveguide couplers and each coupler having two waveguide channels. One channel is used for guiding the optical signal, and is called the guiding channel. The other channel is used for coupling (switching) the optical beam out (or back in) by means of a coupling grating, and is called the coupling channel. The coupling grating is an index grating made along the outside edge of the coupling channel. The coupling gratings not only couple the optical beams out from the respective coupling channel, but also couple the incoming optical beams into the coupling channels. In the present waveguide switch, the two unidirectional waveguide couplers are symmetrically placed to form a coupler-pair. One (heater) electrode is positioned to cover the two coupling gratings along the two coupling channels. When no electric power is applied to the electrode to heat it, and an optical signal is launched into the input port of the guiding channel of the first waveguide coupler, the optical signal will be coupled out from the coupling channel of the first coupler through the coupling grating; the optical signal is then coupled into the second waveguide coupler via the coupling grating along the coupling channel of the second coupler and into the guiding channel of the second waveguide coupler to exit from its output port. When, and as long as, electric power is applied to the electrode, the heat from the electrode produces a negative index modulation to eliminate the two coupling gratings, and the two original unidirectional waveguide couplers become two normal bidirectional couplers. Hence, the optical signal launched into the guiding channel of the first waveguide coupler comes out from the output port of the guiding channel of the first waveguide coupler because no coupling grating couples it out. Thus, the optical signal launched into the input port of the guiding channel of the first waveguide coupler has two possible output ports. The same switching process also occurs if an optical signal is launched into the guiding channel of the second waveguide coupler. Therefore, a 2×2 switching performance may be implemented by choosing between two alternative states, unheated and heated, of the two waveguide couplers. A high degree of isolation between the two waveguide couplers may be achieved with the structures based on the present invention. M×N switching performance may also be implemented by utilizing more than two of the present waveguide couplers with coupling gratings.

In a preferred embodiment according to the present invention, the separation between the two coupling channels of the two waveguide couplers should be large enough, such that coupling of an optical beam does not occur between the two coupling channels once coupling gratings are eliminated by the modulating power. In both waveguide couplers, the guiding channels should be longer than the coupling channels.

BRIEF DESCRIPTION OF THE DRAWINGS

The preferred embodiments of the invention will now be described in conjunction with the annexed drawings, in which.

DETAILED DESCRIPTION OF THE INVENTION

Figure 1A:
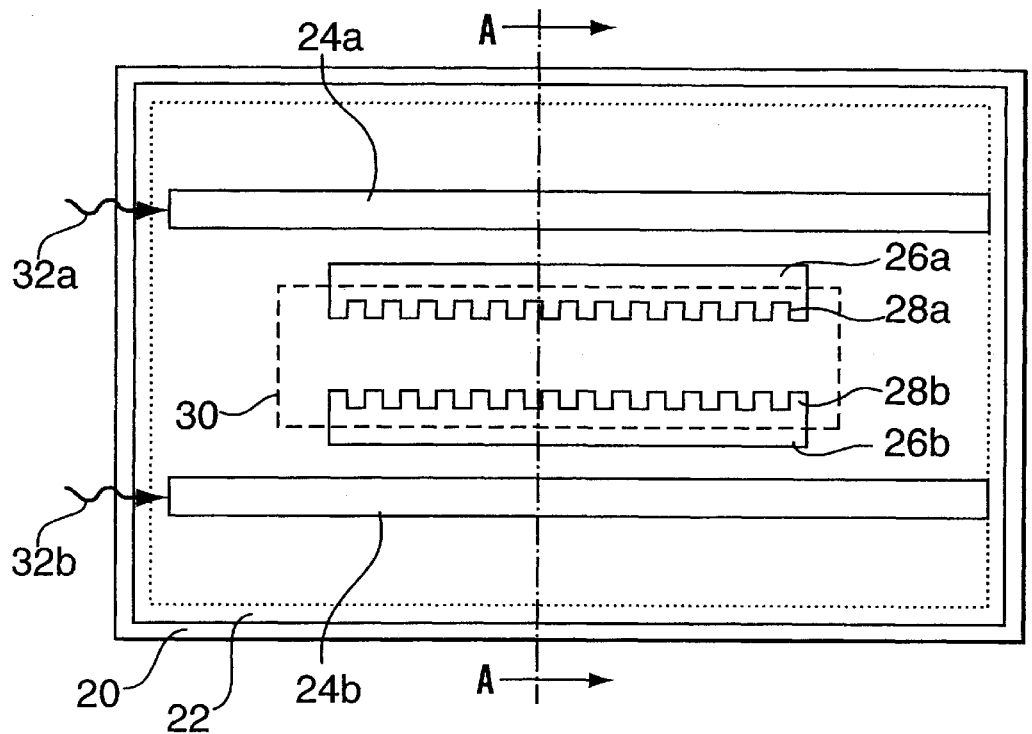
FIG. 1(a) is a top view of a 2×2 thermo-optical waveguide switch according to the present invention.
Figure 1B:
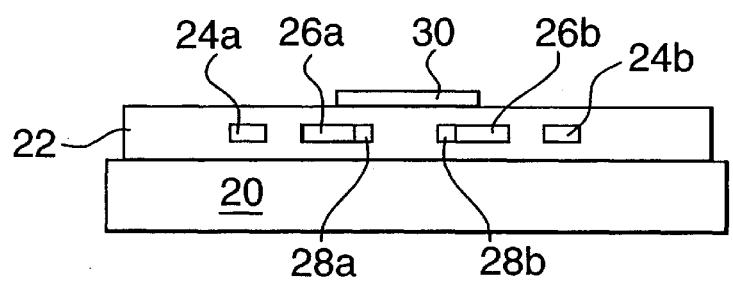
FIG. 1(b) is a vertical cross-section taken along the axis A—A in FIG. 1(a)
Figure 2:
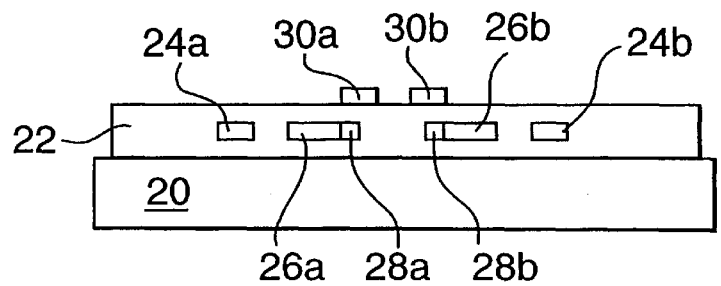
FIG. 2 shows in cross-section an alternative to that shown in FIG. 1(b)

Referring to FIGS. 1(a) and 1(b), the waveguide switch comprises a substrate 20, cladding 22 and four waveguides 24a and 24b, and 26a and 26b, two coupling gratings 28a and 28b, and an (heater) electrode 30 for affecting the gratings 28a and 28b (the electrode 30 is shown in dashed outline in FIG. 1(a). Waveguide 24a, waveguide 26a and coupling grating 28a form the first waveguide coupler. Waveguide 24b, waveguide 26b and coupling grating 28b form the second waveguide coupler. Waveguides 24a and 24b are used for guiding optical beams and are called the guiding channels. Waveguide 26a and 26b are used for coupling the optical beams out from or into a waveguide coupler via the coupling gratings 28a and 24b are called the coupling channels. The modulating electrode 30 is used to eliminate the coupling gratings 28a and 28b when heated by means of electrical power applied thereto. When no electrical power is applied to the modulating electrode 30, gratings 28a and 28b are intact as indicated schematically in FIGS. 1(a) and 1(b). If an optical signal 32a is launched into the guiding channel 24a of the first waveguide coupler, it will be coupled from the guiding channel 24a to the coupling channel 26a and then be coupled out via the coupling grating 28a because it has a coupling-out effect. In the coupler based on the two waveguides 24a and 26a, only coupling from the guiding channel 24a to the coupling channel 26a is allowed, while coupling from the coupling channel 26a to the guiding channel 24a is not, thus a unidirectional coupling process is formed. Because the second waveguide coupler composed of guiding channel 24b and coupling channel 26b is symmetrically placed with respect to the first coupler, the optical signal from the channel 26a can be further coupled into the coupling channel 26b of the second waveguide coupler via the coupling grating 28b. Finally, the optical signal 32a exits out from the output port (right-hand end) of the guiding channel 24b of the second waveguide coupler. FIG. 2 shows an alternative structure of the electrode 30, where it is replaced by two separate electrodes 30a and 30b, which are positioned over the gratings 28a and 28b, respectively.

Figure 3A:
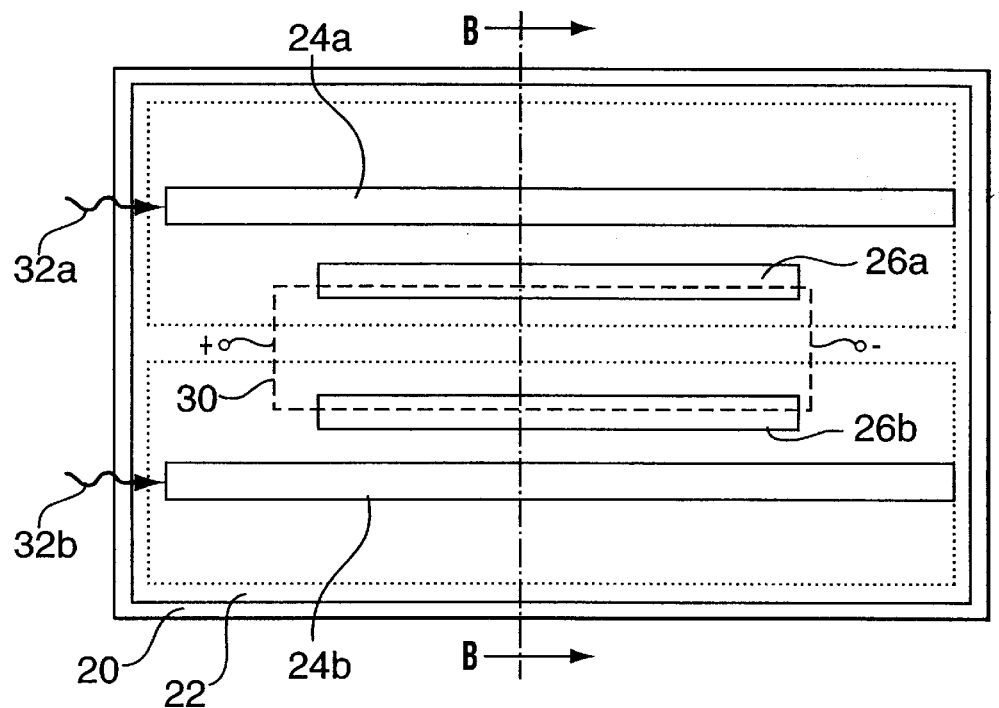
FIG. 3(a) is a top view of the 2×2 thermo-optical waveguide switch in its non-switching state.
Figure 3B:
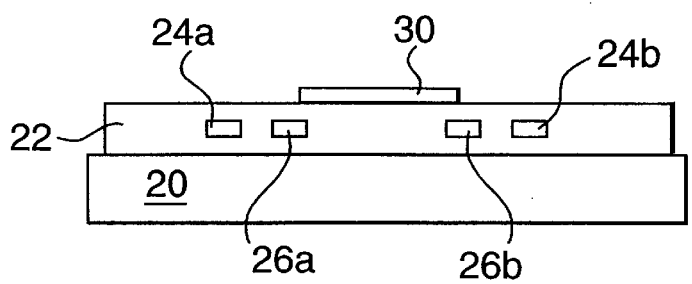
FIG. 3(b) is a vertical cross-section along the axis B—B in FIG. 3(a)

As shown in FIGS. 3(a) and 3(b), if electric power is applied onto the modulating electrode 30 (between terminals +/−) negative refractive index modulation is produced and the coupling gratings 28a and 28b are eliminated. The two waveguide couplers then become two normal bi-directional couplers, and the optical signal launched into the guiding channel 24a is not coupled only to the coupling channel 26a, but is also coupled back to the guiding channel 24a and finally exits from the output port (right-hand end) of the guiding channel 24a of the first waveguide coupler. An optical signal launched into the input port of the first waveguide coupler has two possible output ports, depending on the modulation effect of the electrode 30. The same switching process occurs if an optical signal 32b is launched into the guiding channel 24b of the second waveguide coupler via the modulation effect of the electrode 30. Two-by-two switching performance is provided by these two symmetrically positioned waveguide couplers. The unidirectional coupling process with the coupling-out effect of the coupling grating effectively improves the optical energy transfer efficiency to a high value when the modulation electrode 30 is inactive. And the bi-directional coupling process after the coupling grating is eliminated by application of the electrical power causes the optical beams exit completely from the output port of the original guiding channel 24a or 24b. High switching extinction ratio is provided within the waveguide coupler under application of the modulation effect induced by electrical power. In general, the coupling-in efficiency equals the coupling-out efficiency for the same coupling grating, therefore, high isolation is achieved with this type of waveguide switch. Following are the design consideration of the basic 2×2 switch.

In a waveguide coupler, a coupling grating is used to achieve a higher extinction ratio. To achieve this goal, the primary concern is the coupling efficiency of the coupling grating $\eta_g$, which directly impacts the unidirectional coupling efficiency of the coupling channel $\eta_u$. For convenience, only single-mode coupling is considered between the mode of the guiding channel 24a (or 24b) and the mode of the coupling channel 26a (or 26b).

If no appropriate heat modulation effect is applied onto the electrode 30 for the first coupler, the coupling grating 28a exists, so only the coupling from channel 24a to channel 26a occurs and is unidirectional coupling can be expressed as $$\eta_u = \sum_{n=0}^{N_L} \frac{k_c^2}{\psi^2} \eta_g \sin^2[\psi(n+1)\Delta L]\left[1 - \frac{k_c^2}{\psi^2}\eta_g \sin^2(\psi n \Delta L)\right] \quad (1)$$

For the first coupler, if the heating effect is applied to the electrode 30, the coupling grating 28*a* does not exist, both the coupling process from channel 24*a* to channel 26*a* and the coupling process from channel 26*a* to channel 24*a* exist and the coupling efficiency can be expressed as $$\eta_b = \frac{k_c^2}{\psi^2}\sin^2(\psi L) \quad (2)$$

where ηhd gis the loss coefficient of the coupling grating, which is related to the index change of the grating $\Delta n_g$ and the groove depth $\Delta d$ of the index coupling grating (i.e., $\eta_g \sim \Delta n_g \cdot \Delta d$), $k_c$ is the coupling constant, L is the interaction length and $\Delta L$ is a selected length within which the coupled-out energy from the guiding channel 24*a* to the coupling channel 26*a* is uniform, and $N_L$ is defined by $$N_L = int\left(\frac{L}{\Delta L}\right) \quad (3)$$

The function int $$\left(\frac{L}{\Delta L}\right)$$

is the integer closest to $$\frac{L}{\Delta L}.$$

ψ is defined by $$\psi = (k_c^2 + \Delta^2)^{1/2}, \quad (4a)$$

and $$\Delta = k|N_g - N_c|/2 \quad (4b)$$

where k is the Boltzmann constant, and $N_g$ and $N_c$ are the effective refractive indices of the mode of the guiding channel 24*a* and the mode of the coupling channel 26*a*, respectively. For the single-mode devices, the unidirectional coupling efficiency and the coupling efficiency can be directly calculated by using Eqs. (1), (2), respectively. For the multi-mode devices, the total unidirectional coupling efficiency and the total coupling efficiency can be calculated by using the sum of the normalized mode-to-mode coupling efficiencies defined by Eqs. (1) and (2), respectively. As an optical switch, the extinction ratio is completely determined by the difference of the coupling efficiencies between the unmodulated state (i.e., $\Delta n_m = 0$) defined by Eq. (1) and the unmodulated state $$\left(\Delta n_m = -\frac{dn}{dT} \cdot \Delta T \approx \Delta n_g\right)$$

for the TO modulation) defined by Eq. (2). For the TO materials, $$\frac{dn}{dT}$$

is the corresponding TO coefficient and $\Delta T$ is the change in temperature. Note from Eq. (1) that the undirectional coupling efficiency can be up to 100% in theory by appropriately choosing the values of ψ, $\eta_g$ and L, therefore, the coupling-out efficiency of the waveguide coupler is approximately 100%. So, an optical signal is launched into the input port of the waveguide coupler, its output efficiency at the output port of this waveguide coupler can be achieved to zero in theory. Note from Eq. (2) that the coupling efficiency can be up to 100% in theory by appropriately choosing ψ and L. So, the output efficiency of the optical signal at the same output port can be up to 100% in theory. Therefore, the difference between these two output efficiencies at the same output port can be achieved to a high value. Namely, a much higher switching contrast can be achieved with the optical waveguide switch. Analysis about the coupling efficiency of the coupling gratings attached on waveguides is very complicated. In addition, the thermal modulation effect induced by electrical power through the electrode 30 can increase the isolation between two output ports of the 2×2 switch as well as eliminating the coupling gratings. gratings attached on waveguides is very complicated. In addition, the thermal modulation effect induced by electrical power through the electrode 30 can increase the isolation between two output ports of the 2×2 switch as well as eliminating the coupling gratings.

In the preferred implementation of the waveguide switch, the waveguide couplers and the waveguide channels are planar waveguides arranged in parallel between lower and upper cladding layers, with the electrode 30 (or electrodes 30*a* and 30*b*) on top covering the coupling gratings, which are thermo-optically modulated by applying electrical power to heat the electrode 30. The guiding and coupling channels may be identical or not, and may be single or multi-mode waveguides. The interaction length between the guiding and coupling channels (which is the length of the coupling waveguide) is between 5 and 15 mm. The power required to heat the electrode 30, which is an evaporated or deposited layer of alluminum, chromium, gold or the like, should be between 100 and 1000 mw.

Figure 4:
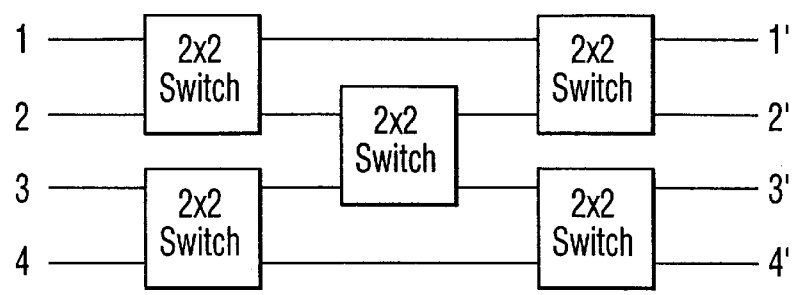
FIG. 4 depicts a 4×4 switch utilizing five of the 2×2 switches shown in the preceding figures.

In FIG. 4 a four-by-four optical switch is shown utilizing five of the basic 2×2 units. The five or more units plus a general M-by-N switch, may all be integrated on a single thermo-optic substrate. The 4×4 switch shown enables any-one of the four inputs (1,2,3 and 4) to be switched to anyone of the four outputs (1',2',3' and 4').

In the design of the electrodes 30, 30*a* and 30*b* as shown in the drawings, the electrodes do not cover significantly more than the gratings 28*a* and 28*b*. Should the electrodes cover the entire coupling waveguide channels, the switch will also operate although with some what different characteristics. Likewise, coupling gratings may not be required in all applications and the switch will continue to operate, but again with some what altered characteristics. Such modification in the design or application of the switch would be readily apparent to those skilled in the art.

Finally four useful papers for understanding "grating couplers" are the following:

Theory and Experiments on Grating Couplers for Thin-Film Waveguides by Ghizoni, et al, Journal of Quantum Electronics, vol. QE-12, No. 2, February 1976, pp.69–73;

Analysis of one-way coupling between parallel asymmetric multi-mode waveguides by Sun, et al, in SPIE vol. 2994 (1997), pp.319–329;

Optimized coupling of a Gaussian beam into an optical waveguide with a grating coupler: comparison of experimental and theoretical results by Pascal, et al, in Applied Optics, Apr. 20, 1997/vol. 36, No. 12, pp. 2443–2447; and Wavelength-selective coupler and add-drop multiplexer using long-period fiber gratings by Grubsky, et al, in Optical Fiber Communication Conference, Technical Digest, Mar. 7, 2000, pp. 28–30.

A useful copending commonly assigned application by the same inventor is titled HIGH-PERFORMANCE ELECTRO-OPTIC INTENSITY MODULATOR USING POLYMERIC WAVEGUIDES AND GRATING MODULATION, Ser. No. 09/518,954, filed Mar. 2, 2000, is incorporated herein by reference.

What is claimed is:

1. An optical switch for switching an optical signal from at least one input to one of at least two outputs, comprising:

(a) a first waveguide having an input at one end and an output at the other end;

(b) a first coupling waveguide proximal to said first waveguide along an interaction stretch thereof having an index grating on the distal side along the interaction stretch;

(c) a second coupling waveguide identical to said first coupling waveguide and disposed proximal and mirror-symmetrical thereto;

(d) a second waveguide proximal to said second coupling waveguide along an interaction stretch thereof and distal from its index grating; and (e) said second waveguide having an output at one end thereof whereby an optical signal at the input of said first waveguide exits at only one of the output of the first waveguide and the output of the second waveguide depending on the state of said index gratings.

* * * * *